US012512636B2

(12) United States Patent
Tanaka et al.

(10) Patent No.: US 12,512,636 B2
(45) Date of Patent: Dec. 30, 2025

(54) CONNECTOR DEVICE CAPABLE OF SUPPRESSING INCREASE IN PROJECTION AREA OF BOARD-SIDE CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shinji Tanaka, Mie (JP); Yutaka Kobayashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 315 days.

(21) Appl. No.: 18/016,782

(22) PCT Filed: Jul. 16, 2021

(86) PCT No.: PCT/JP2021/026810
§ 371 (c)(1),
(2) Date: Jan. 18, 2023

(87) PCT Pub. No.: WO2022/030225
PCT Pub. Date: Feb. 10, 2022

(65) Prior Publication Data
US 2023/0291158 A1 Sep. 14, 2023

(30) Foreign Application Priority Data
Aug. 6, 2020 (JP) ................................ 2020-133700

(51) Int. Cl.
*H01R 13/629* (2006.01)
*H01R 27/00* (2006.01)

(52) U.S. Cl.
CPC ....... *H01R 27/00* (2013.01); *H01R 13/62911* (2013.01)

(58) Field of Classification Search
CPC .. H01R 27/00; H01R 13/62911; H01R 13/02; H01R 13/514; H01R 13/639;
(Continued)

(56) References Cited

U.S. PATENT DOCUMENTS 4,580,862 A * 4/1986 Johnson ............ H01R 13/6315 439/585
4,697,859 A * 10/1987 Fisher, Jr. .......... H01R 13/6315 439/246
(Continued)

FOREIGN PATENT DOCUMENTS

CN 103378429 A * 10/2013 ............ H01R 12/91
JP 2018-113224 A 7/2018
JP 2018-186056 A 11/2018

OTHER PUBLICATIONS

English translation of CN 103378429 (Year: 2025).*
International Search Report issued on Sep. 21, 2021 for WO 2022/030225 A1 (4 pages).

*Primary Examiner* — Tulsidas C Patel
*Assistant Examiner* — Carlos E Lopez-Pagan
(74) *Attorney, Agent, or Firm* — Venjuris, P.C.

(57) ABSTRACT

It is aimed to reduce a projection area of a board-side connector on a mounting surface of a circuit board. A connector device (A) is provided with a board-side connector (10), a mating connector (30) facing the board-side connector (10), an adapter (40) rockably supported in the mating connector (30), a tip part of the adapter being connected to the board-side connector (10), a first guide
(Continued)

portion (12) and a second guide portion (21) provided on a tip part of the board-side connector (10) and having outer peripheral surfaces inclined to reduce a diameter toward a tip side, and a guided portion (50) provided on the tip part of the adapter (40) and configured to correct a position shift of the adapter (40) with respect to the board-side connector (10) by sliding in contact with the first and second guide portions (12, 21).

7 Claims, 9 Drawing Sheets

(58) Field of Classification Search
CPC ...... H01R 12/71; H01R 24/50; H01R 24/542; H01R 12/91; H01R 13/6315
See application file for complete search history.

(56) References Cited

U.S. PATENT DOCUMENTS

| | | | | |
|---|---|---|---|---|
| 4,925,403 | A * | 5/1990 | Zorzy | H01R 13/6315 439/578 |
| 6,497,579 | B1 * | 12/2002 | Garbini | H01R 13/6315 439/246 |
| 9,356,374 | B2 * | 5/2016 | Hoyack | H01R 13/6581 |
| 2012/0295478 | A1 * | 11/2012 | Mrowka | H01R 24/50 439/578 |
| 2014/0073160 | A1 * | 3/2014 | Shinder-Lerner | H01R 12/91 439/246 |
| 2017/0047683 | A1 * | 2/2017 | Yanase | H01R 13/6315 |
| 2019/0013618 | A1 * | 1/2019 | Barbet | G02B 6/3893 |
| 2020/0091665 | A1 * | 3/2020 | Maki | H01R 13/629 |

* cited by examiner

CONNECTOR DEVICE CAPABLE OF SUPPRESSING INCREASE IN PROJECTION AREA OF BOARD-SIDE CONNECTOR

CROSS REFERENCE TO RELATED APPLICATIONS

This application is a national phase of PCT application No. PCT/JP2021/026810, filed on Jul. 16, 2021, which claims priority from Japanese patent application No. 2020-133700, filed on Aug. 6, 2020, all of which are incorporated herein by reference.

BACKGROUND OF THE INVENTION

(1) Field of the Invention

The present disclosure relates to a connector device.

(2) Description of Related Art

Patent Document 1 discloses a structure for connecting a board-side connector and a second connector facing each other via an adapter. The adapter is supported in the board-side connector and can rock to be inclined with respect to a facing direction of the both connectors. The second connector is formed with a guide portion spreading into a flare shape. If the first and second connectors are connected while being shifted in position, the adapter rocks by bringing a tip part thereof into sliding contact with the guide portion and is connected to the second connector.

PRIOR ART DOCUMENT

Patent Document

Patent Document 1: US Patent Publication No. 2012/0295478 A1

SUMMARY OF THE INVENTION

The guide portion is shaped to spread into a flare shape. Thus, in the case of mounting the second connector on a circuit board, a projection area of the guide portion on the circuit board is larger than a mounting area of the second connector on the circuit board. As a result, an effective area in which other mounting components can be mounted is narrowed by the projection area of the guide portion on a mounting surface of the circuit board.

A connector device of the present disclosure was completed on the basis of the above situation and aims to reduce a projection area of a board-side connector on a mounting surface of a circuit board.

The present disclosure is directed to a connector device with a board-side connector, a mating connector facing the board-side connector, an adapter rockably supported in the mating connector, a tip part of the adapter being connected to the board-side connector, a guide portion provided on a tip part of the board-side connector, an outer peripheral surface of the guide portion being inclined to reduce a diameter toward a tip side, and a guided portion provided on the tip part of the adapter, the guided portion correcting a position shift of the adapter with respect to the board-side connector by sliding in contact with the guide portion.

According to the present disclosure, it is possible to reduce a projection area of a board-side connector on a mounting surface of a circuit board.

DETAILED DESCRIPTION OF THE INVENTION

Description of Embodiments of Present Disclosure

Figure 1:
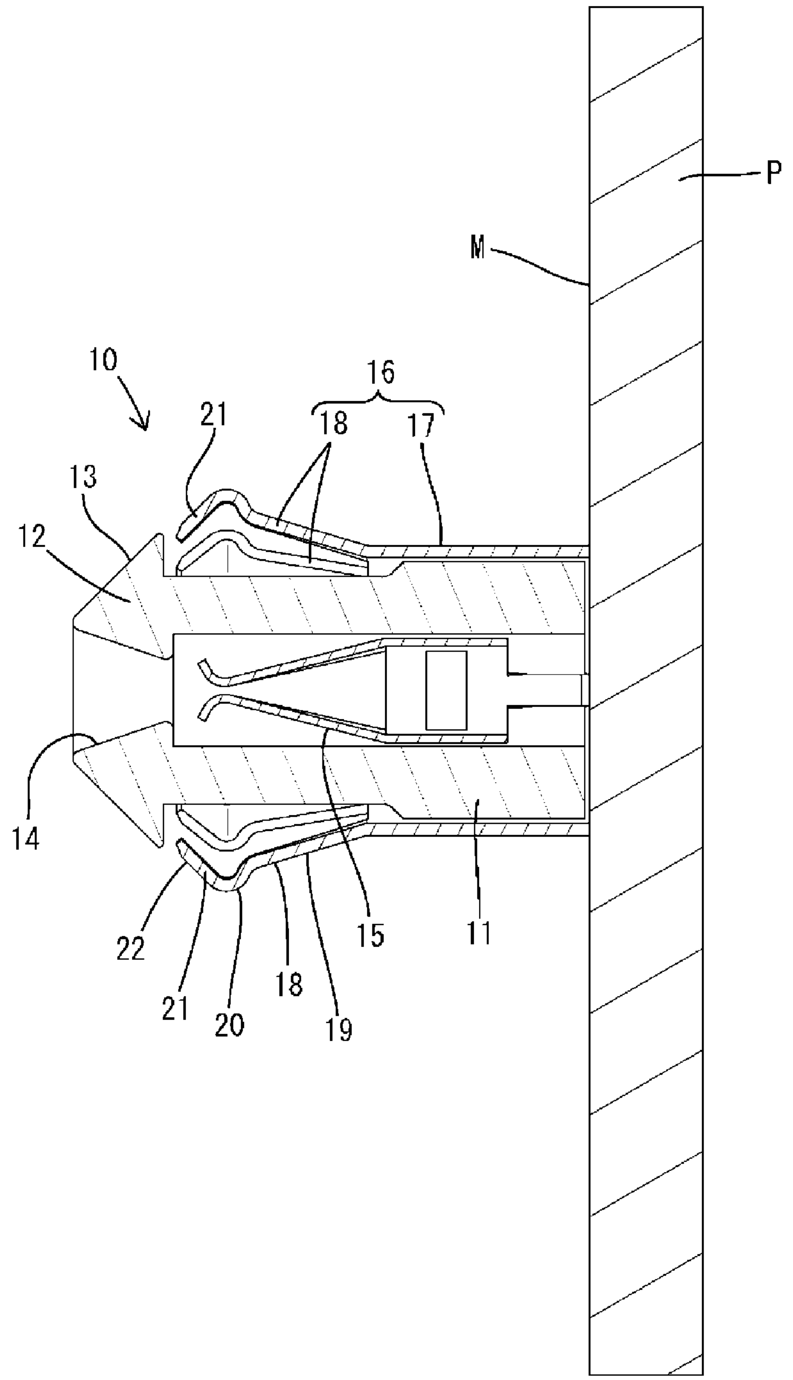
FIG. 1 is a side view in section of a board-side connector constituting a connector device of a first embodiment.

First, embodiments of the present disclosure are listed and described.

(1) The connector device of the present disclosure is provided with a board-side connector, a mating connector facing the board-side connector, an adapter rockably supported in the mating connector, a tip part of the adapter being connected to the board-side connector, a guide portion provided on a tip part of the board-side connector, an outer peripheral surface of the guide portion being inclined to reduce a diameter toward a tip side, and a guided portion provided on the tip part of the adapter, the guided portion correcting a position shift of the adapter with respect to the board-side connector by sliding in contact with the guide portion. According to the configuration of the present disclosure, the guided portion slides in contact with the guide portion to rock the adapter and the tip part of the adapter is fit to the board-side connector in the process of connecting the board-side connector and the mating connector shifted in position. Since the guide portion of the board-side connector is inclined to reduce the diameter toward the tip part, a projection area of the board-side connector on a mounting surface of a circuit board can be reduced.

(2) Preferably, the board-side connector includes a board-side inner conductor and a board-side dielectric projecting further toward the adapter than the board-side inner conductor, and a tip part of the board-side dielectric has a function as the guide portion. According to this configuration, the interference of the board-side inner conductor with the guided portion can be prevented.

(3) Preferably, the board-side connector includes a board-side dielectric and a board-side outer conductor surrounding the board-side dielectric, and a tip part of the board-side outer conductor has a function as the guide portion. According to this configuration, a wide guide range by the guide portions can be secured as compared to the case where the guide portion is formed only on the board-side dielectric.

(4) Preferably, in (3), a resilient contact piece cantilevered toward the adapter is formed on the tip part of the board-side outer conductor, and the guide portion of the board-side dielectric is formed to cover a tip part of the resilient contact piece. According to this configuration, the interference of the guided portion with the tip part of the resilient contact piece can be prevented.

(5) Preferably, the guided portion is formed on a tip part of a movable outer conductor constituting the adapter. According to this configuration, the number of components is reduced as compared to the case where the guided portion is formed on a dedicated component separate from the movable outer conductor.

(6) Preferably, in (5), a board-side outer conductor constituting the board-side connector includes a plurality of resilient contact pieces spaced apart in a circumferential direction, and the guided portion and the movable outer conductor surround the plurality of resilient contact pieces with the adapter and the board-side connector fit. According to this configuration, since the leakage of electromagnetic noise in gaps between the resilient contact pieces adjacent in the circumferential direction is absorbed by the guided portion, a shielding function can be improved.

(7) Preferably, a clearance in a radial direction is secured between the guided portion and a board-side outer conductor constituting the board-side connector with the adapter and the board-side connector fit. According to this configuration, even if the adapter rocks and an axis thereof is tilted with respect to an axis of the board-side connector, the interference of the guided portion and the board-side outer conductor can be prevented.

DETAILS OF EMBODIMENT OF PRESENT DISCLOSURE

First Embodiment

Figure 3:
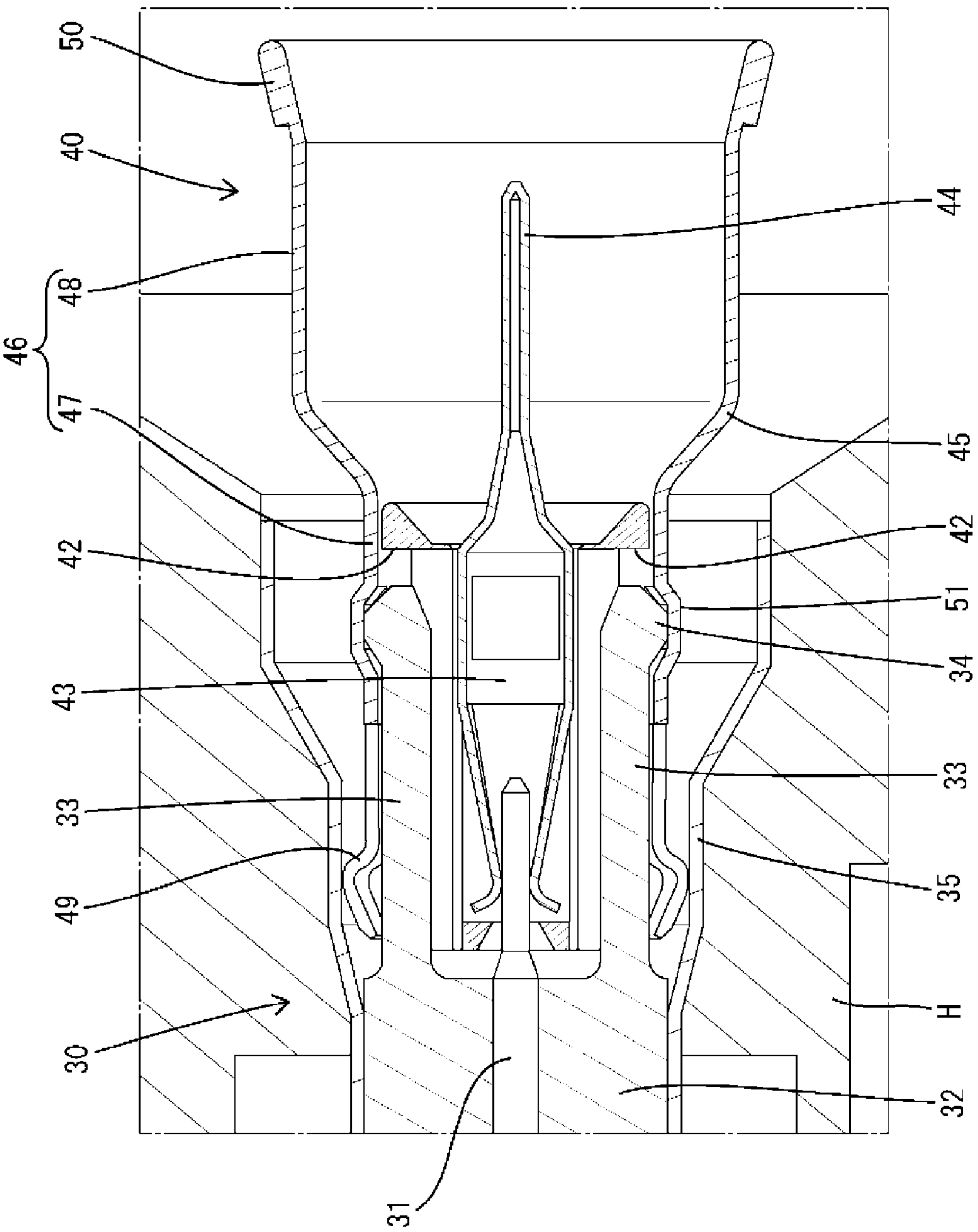
FIG. 3 is an enlarged side view in section showing a state where an adapter is mounted in the mating connector.
Figure 4:
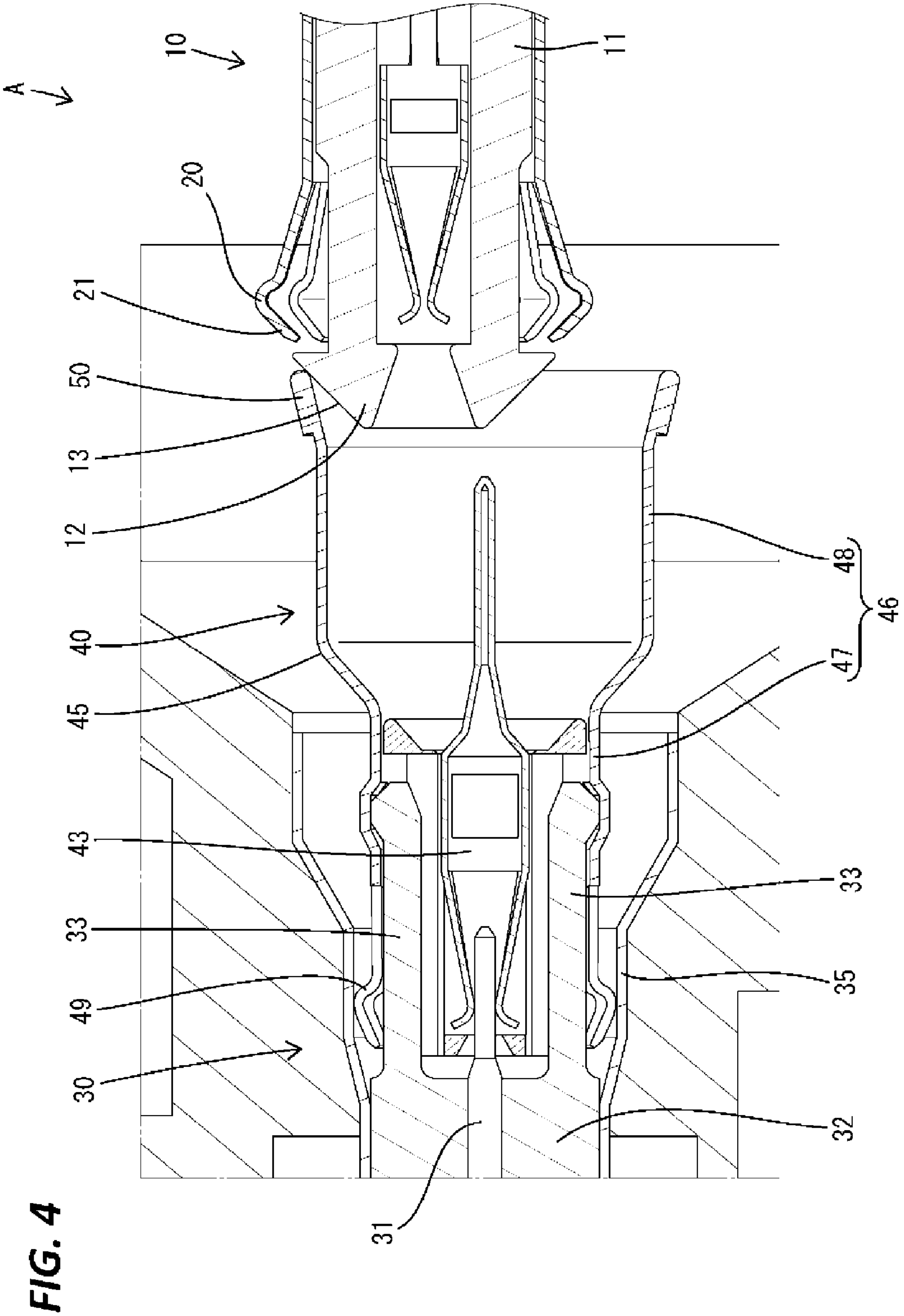
FIG. 4 is a partial enlarged side view in section showing a state where the adapter is guided by a guide portion of the board-side connector.
Figure 5:
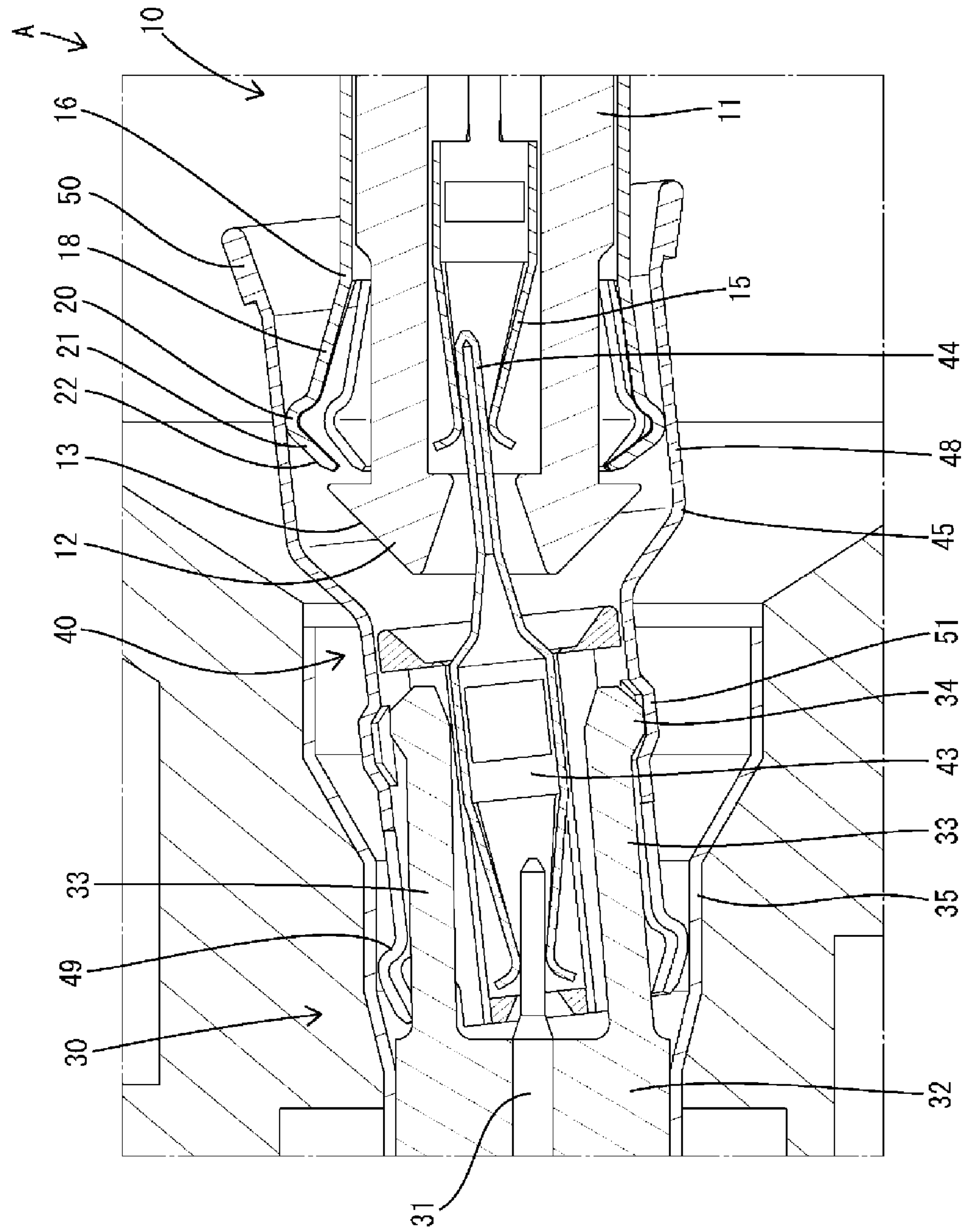
FIG. 5 is a partial enlarged side view in section showing a state where the board-side connector and the mating connector shifted in position are properly connected.

A first specific embodiment of the present disclosure is described below with reference to FIGS. 1 to 5. Note that the present invention is not limited to these illustrations, but is represented by claims and intended to include all changes in the scope of claims and in the meaning and scope of equivalents. A connector device A of the first embodiment is provided with a circuit board P (see FIG. 1) extending in a vertical direction with a mounting surface M facing forward, a board-side connector 10, a mating connector 30 and an adapter 40. In the first embodiment, a left side in FIGS. 1, 4 and 5 is defined as a front side concerning a front-rear direction of the board-side connector 10. A right side in FIGS. 2 to 5 is defined as a front side concerning front-rear directions of the mating connector 30 and the adapter 40.

As shown in FIG. 1, the board-side connector 10 is fixedly mounted with an axis held perpendicular to the mounting surface M of the circuit board P. The board-side connector 10 includes a board-side dielectric 11 having an axis oriented in the front-rear direction, a board-side inner conductor 15 having an axis oriented coaxially with the board-side dielectric 11 and a board-side outer conductor 16 having an axis oriented coaxially with the board-side inner conductor 15 and the board-side dielectric 11.

The board-side dielectric 11 has a hollow cylindrical shape as a whole. A first guide portion 12 having a truncated conical shape coaxial with the board-side dielectric 11 is formed in a front end part (tip part) of the board-side dielectric 11. A circular annular region on an outer peripheral side, out of the front surface of the first guide portion 12, serves as a first guide surface 13 inclined with respect to the axis of the board-side dielectric 11 to reduce a diameter toward the front. A diameter of the first guide portion 12 (first guide surface 13) is minimum in the front end of the first guide portion 12 and maximum in the rear end of the first guide portion 12. A circular annular region on an inner peripheral side, out of the front surface of the first guide portion 12, serves as a guiding surface 14 inclined with respect to the axis of the board-side dielectric 11 to increase a diameter toward the front.

The board-side inner conductor 15 projects forward from the mounting surface M of the circuit board P and is accommodated in the board-side dielectric 11. The front end of the board-side inner conductor 15 is located rearward of the rear end of the guiding surface 14. The board-side outer conductor 16 has a hollow cylindrical shape as a whole and projects forward from the mounting surface M of the circuit board P. The board-side outer conductor 16 surrounds a region of the board-side dielectric 11 behind (closer to the circuit board P) the first guide portion 12. The board-side outer conductor 16 includes a hollow cylindrical portion 17 fixed to the mounting surface M and a plurality of resilient contact pieces 18 shaped to be cantilevered forward from the front end edge of the hollow cylindrical portion 17. The plurality of resilient contact pieces 18 are arranged at constant intervals in a circumferential direction.

The resilient contact piece 18 includes a base portion 19 connected to the hollow cylindrical portion 17, an enlarged diameter portion 20 formed by bending a front end part of the base portion 19 radially outward, and a second guide portion 21 connected to the enlarged diameter portion 20. The second guide portion 21 is inclined with respect to the axis of the board-side outer conductor 16 to gradually reduce a diameter toward the front. The front surface of the second guide portion 21 serves as a second guide surface 22. The front end of the second guide portion 21 (resilient contact piece 18) is located slightly behind the rear end of the first guide portion 12 (first guide surface 13). A diameter of a virtual circle connecting the front ends of the second guide surfaces 22 is smaller than a maximum diameter of the first guide portion 12. A front end part of the second guide portion 21 is covered from front by an outer peripheral edge part of the first guide portion 12.

In a two-dimensional plane orthogonal to the axis of the board-side connector 10, i.e. in a two-dimensional plane perpendicular to the planes of FIGS. 1 to 5, a dimensional difference (hereinafter, referred to as a maximum guide amount) between a minimum diameter of the first guide portion 12 and the maximum diameter of the second guide portions 21 is set to be larger than an assumed maximum position shift amount between the board-side connector 10 and the mating connector 30.

A mounting area of the board-side connector 10 on the mounting surface M of the circuit board P is the same as a cross-sectional area of the hollow cylindrical portion 17 of the board-side outer conductor 16. A diameter of the board-side connector 10 is maximized in the enlarged diameter portions 20 (rear ends of the second guide portions 21) of the board-side outer conductor 16. A dimensional difference between a diameter of the hollow cylindrical portion 17 and a diameter of a virtual circle connecting the enlarged diameter portions 20 is smaller than the maximum guide amount by the first and second guide portions 12, 21. In a plan view of the circuit board P viewed in parallel to the axis of the board-side connector 10, a projection area of the board-side connector 10 on the mounting surface M is an area of a region equivalent to the virtual circle connecting the enlarged diameter portions 20. The projection area of the board-side connector 10 on the mounting surface M is not largely different from the mounting area of the board-side connector 10 on the mounting surface M.

Figure 2:
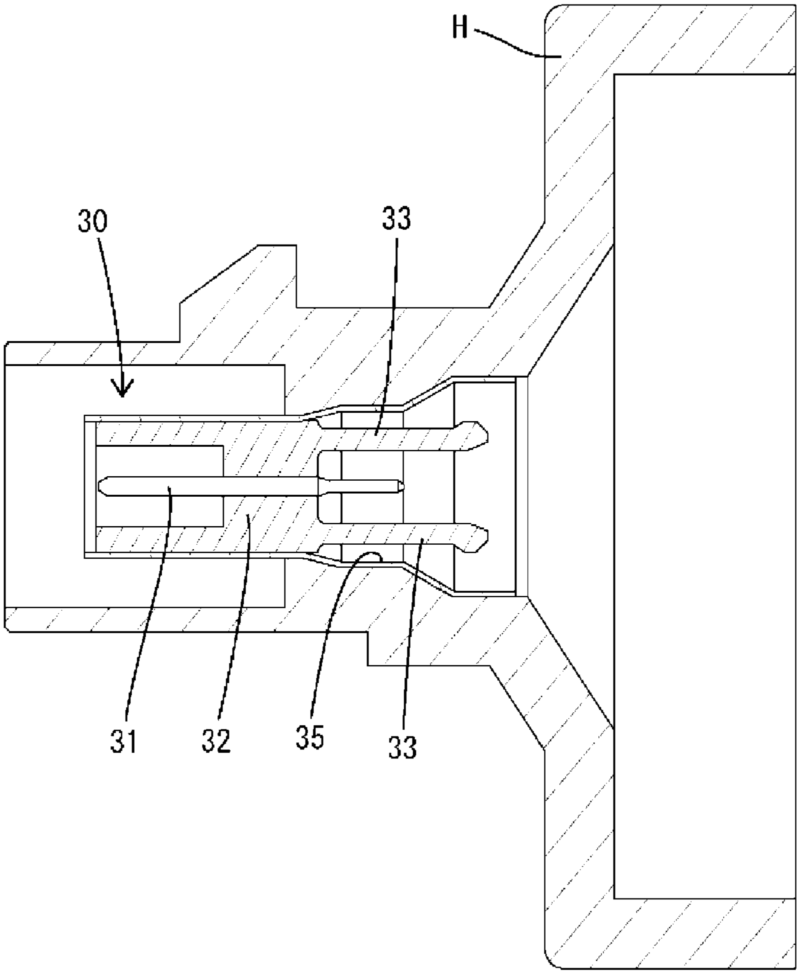
FIG. 2 is a side view in section of a mating connector constituting the connector device.

As shown in FIG. 2, the mating connector 30 is connected, for example, to an in-vehicle camera (not shown) while being accommodated in a housing H. As shown in FIG. 3, the mating connector 30 includes a mating inner conductor 31 having an axis oriented in the front-rear direction, a tubular mating dielectric 32 having an axis oriented in the front-rear direction and a hollow cylindrical mating outer conductor 35 having an axis oriented in the front-rear direction. The mating dielectric 32 includes a pair of holding portions 33 projecting forward from the front end surface thereof. The mating dielectric 32 coaxially holds the mating inner conductor 31 penetrating therethrough. The mating outer conductor 35 coaxially surrounds the mating dielectric 32.

As shown in FIGS. 3 to 5, the adapter 40 includes a tubular movable dielectric 41, an elongated movable inner conductor 43 coaxially mounted in the movable dielectric 41 and a movable outer conductor 45. The movable dielectric 41 is formed with a pair of accommodation recesses 42. The movable inner conductor 43 includes a tab 44 projecting forward from the front end of the movable dielectric 41. The movable outer conductor 45 is a single component including a hollow cylindrical outer conductor body portion 46, a plurality of resilient pieces 49 spaced apart in a circumferential direction and a guided portion 50.

The outer conductor body portion 46 includes a small diameter portion 47 and a large diameter portion 48. The large diameter portion 48 has a larger diameter than the small diameter portion 47 and projects forward from the front end of the small diameter portion 47. The plurality of resilient pieces 49 are cantilevered rearward from the rear end of the small diameter portion 47. Out of the outer conductor, the small diameter portion 47 and the resilient pieces 49 surround the movable dielectric 41.

The guided portion 50 has a tapered hollow cylindrical shape to increase a diameter toward the front. The guided portion 50 is formed to continuously extend forward (toward the board-side connector 10) over an entire periphery from the front end edge of the large diameter portion 48. The large diameter portion 48 and the guided portion 50 are located forward of the front end of the movable dielectric 41 and surround the tab 44 of the movable inner conductor 43.

An inner diameter of the guided portion 50 is minimum in the rear end of the guided portion 50 and maximum in the front end of the guided portion 50. A maximum inner diameter of the guided portion 50 is larger than a maximum outer diameter of the board-side connector 10. The maximum outer diameter of the board-side connector 10 is the diameter of the virtual circle connecting the enlarged diameter portions 20. A minimum inner diameter of the guided portion 50 and an inner diameter of the large diameter portion 48 are smaller than the maximum outer diameter of the board-side connector 10.

As shown in FIG. 3, the adapter 40 is mounted in the mating connector 30. With the adapter 40 mounted in the mating connector 30, the holding portions 33 are accommodated in the accommodation recesses 42, the movable inner conductor 43 is connected to the mating inner conductor 31 and the resilient pieces 49 are resiliently in contact with the inner peripheral surface of the mating outer conductor 35. The adapter 40 in a mounted state is coaxially held in the mating connector 30 by fitting holding recesses 51 of the small diameter portion 47 to holding projections 34 on the front ends of the holding portions 33, placing the resilient pieces 49 along the outer surfaces of the holding portions 33 and resiliently bringing the resilient pieces 49 into contact with the inner periphery of the mating outer conductor 35. The movable dielectric 41 is surrounded by the mating outer conductor 35 and the large diameter portion 48 and the guided portion 50 of the adapter 40 project further forward than the front end of the mating outer conductor 35.

Next, a process of connecting the board-side connector 10 and the mating connector 30 with the board-side connector 10 positionally shifted relatively upward with respect to the mating connector 30 is described. If the board-side connector 10 and the mating connector 30 are brought closer while facing each other with the axes of the both connectors 10, 30 held in parallel, an upper end part of the front end of the guided portion 50 comes into contact with an upper end part of the first guide surface 13 as shown in FIG. 4. At this time, the adapter 40 is held coaxially with the mating connector 30.

If the board-side connector 10 and the mating connector 30 are further brought closer from this state, the guided portion 50 slides in contact with the first guide surface 13 and the adapter 40 is displaced to tilt the axis with respect to the mating connector 30 by the inclination of the first guide surface 13. At this time, the upper holding portion 33 is resiliently displaced upward by being pushed by the movable inner conductor 43 and the lower holding portion 33 is resiliently displaced downward by being pushed by the small diameter portion 47. The resilient pieces 49 are kept in contact with the mating outer conductor 35.

If the board-side connector 10 and the mating connector 30 are further brought closer, the guided portion 50 rides onto the second guide portions 21 from the outer peripheral edge of the first guide surface 13 and slides in contact with the second guide surfaces 22, and the adapter 40 is further inclined by the inclination of the second guide surfaces 22. After the guided portion 50 passes through the second guide portions 21 and the enlarged diameter portions 20, the board-side connector 10 and the mating connector 30 are further connected in a state where the large diameter portion 48 of the adapter 40 slides in contact with the enlarged diameter portions 20. During this time, the board-side inner conductor 15 and the tab 44 of the movable inner conductor 43 are connected. As shown in FIG. 5, position shifts of the board-side connector 10 and the mating connector 30 are absorbed by the adapter 40 being inclined by the first and second guide portions 12, 21, and the board-side connector 10 and the mating connector 30 are properly connected.

The connector device A of the first embodiment includes the board-side connector 10, the mating connector 30 and the adapter 40. The mating connector 30 is facing the board-side connector 10 with the axes oriented in parallel. A base end part (rear end part) of the adapter 40 is rockably supported in the mating connector 30. A front end part (tip part) of the adapter 40 is connected to the board-side connector 10.

The tip part of the board-side connector 10 is provided with the first and second guide portions 12, 21 inclined to reduce the diameter of the outer peripheral surface toward the front end side (tip side). The front end part (tip part) of the adapter 40 is provided with the guided portion 50 for correcting a position shift of the adapter 40 with respect to the board-side connector 10 by sliding in contact with the first guide surface 13 of the first guide portion 12 and the second guide surfaces 22 of the second guide portion 21.

According to this configuration, in the process of connecting the board-side connector 10 and the mating connector 30 shifted in position, the guided portion 50 slides in contact with the first and second guide portions 12, 21, whereby the adapter 40 rocks and the tip part of the adapter 40 is fit to the board-side connector 10. Since the first and second guide portions 12, 21 are inclined to reduce the diameters toward the front end part (tip part), the projection area of the board-side connector 10 on the mounting surface M of the circuit board P can be reduced.

The board-side connector 10 includes the board-side inner conductor 15 and the board-side dielectric 11 projecting further toward the adapter 40 than the board-side inner conductor 15. The front end part (tip part) of the board-side dielectric 11 has a function as the first guide portion 12. According to this configuration, the interference of the board-side inner conductor 15 with the guided portion 50 can be prevented.

The board-side connector 10 includes the board-side outer conductor 16 surrounding the board-side dielectric 11. The tip part of the board-side outer conductor 16 has a function as the second guide portions 21. According to this configuration, a wide guide range by the first and second guide portions 12, 21 can be secured as compared to the case where only the board-side dielectric 11 is formed with a guide portion (first guide portion 12).

The tip part of the board-side outer conductor 16 is formed with the resilient contact pieces 18 cantilevered toward the adapter 40. An outer peripheral edge part of the first guide portion 12 of the board-side dielectric 11 is formed to cover front end parts (tip parts) of the resilient contact pieces 18, i.e. inner peripheral edge parts of the second guide portions 21. According to this configuration, the interference of the guided portion 50 with the tip parts of the resilient contact pieces 18 can be prevented.

The guided portion 50 is formed in the front end part (tip part) of the movable outer conductor 45 constituting the adapter 40. According to this configuration, in the process of connecting the board-side connector 10 and the mating connector 30, the guided portion 50 can transition to a state in contact with the movable outer conductor 45 after passing through the first and second guide portions 12, 21. Further, the number of components is reduced as compared to the case where the guided portion 50 is formed on a dedicated component separate from the movable outer conductor 45.

The board-side outer conductor 16 constituting the board-side connector 10 is provided with the plurality of resilient contact pieces 18 spaced apart in the circumferential direction. With the adapter 40 and the board-side connector 10 fit, the movable outer conductor 45 and the guided portion 50 surround the plurality of resilient contact pieces 18. According to this configuration, since the leakage of electromagnetic noise in gaps between the resilient contact pieces 18 adjacent in the circumferential direction is absorbed by the guided portion 50 and the movable outer conductor 45, a shielding function can be improved.

With the adapter 40 and the board-side connector 10 fit, a clearance in a radial direction is secured between the guided portion 50 and the resilient contact pieces 18 of the board-side outer conductor 16 constituting the board-side connector 10 as shown in FIG. 5. According to this configuration, even if the adapter 40 rocks and the axis thereof is tilted with respect to the axis of the board-side connector 10, the interference of the guided portion 50 and the board-side outer conductor 16 can be prevented.

Second Embodiment

A second specific embodiment of a connector device B of the present disclosure is described below with reference to FIGS. 6 to 9. The connector device B of the second embodiment is different in configuration from the first embodiment in a mating connector 60 and an adapter 70. Since the other configuration is the same as in the first embodiment, the same components are denoted by the same reference signs and the structures, functions and effects thereof are not described. In the second embodiment, a left side in FIGS. 8 and 9 is defined as a front side concerning a front-rear direction of a board-side connector 10. A right side in FIGS. 7 to 9 is defined as a front side concerning front-rear directions of the mating connector 60 and the adapter 70.

Figure 6:
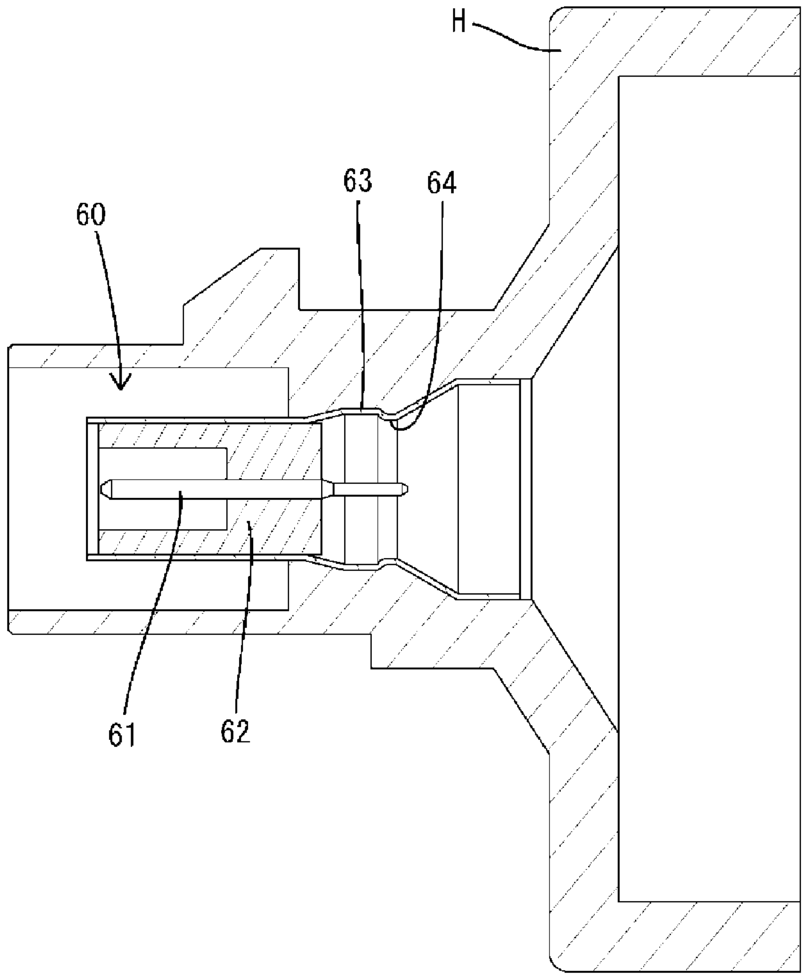
FIG. 6 is a side view in section of a mating connector constituting a connector device of a second embodiment.

As shown in FIG. 6, the mating connector 60 is connected, for example, to an in-vehicle camera (not shown) while being accommodated in a housing H. As shown in FIG. 7, the mating connector 60 includes a mating inner conductor 61 having an axis oriented in the front-rear direction, a tubular mating dielectric 62 having an axis oriented in the front-rear direction and a hollow cylindrical mating outer conductor 63 having an axis oriented in the front-rear direction. The mating dielectric 62 coaxially holds the mating inner conductor 61 penetrating therethrough. The mating outer conductor 63 coaxially surrounds the mating dielectric 62. The mating outer conductor 63 is formed with a holding protrusion 64 extending in a circumferential direction and formed by causing an inner peripheral surface to project over an entire periphery.

Figure 7:
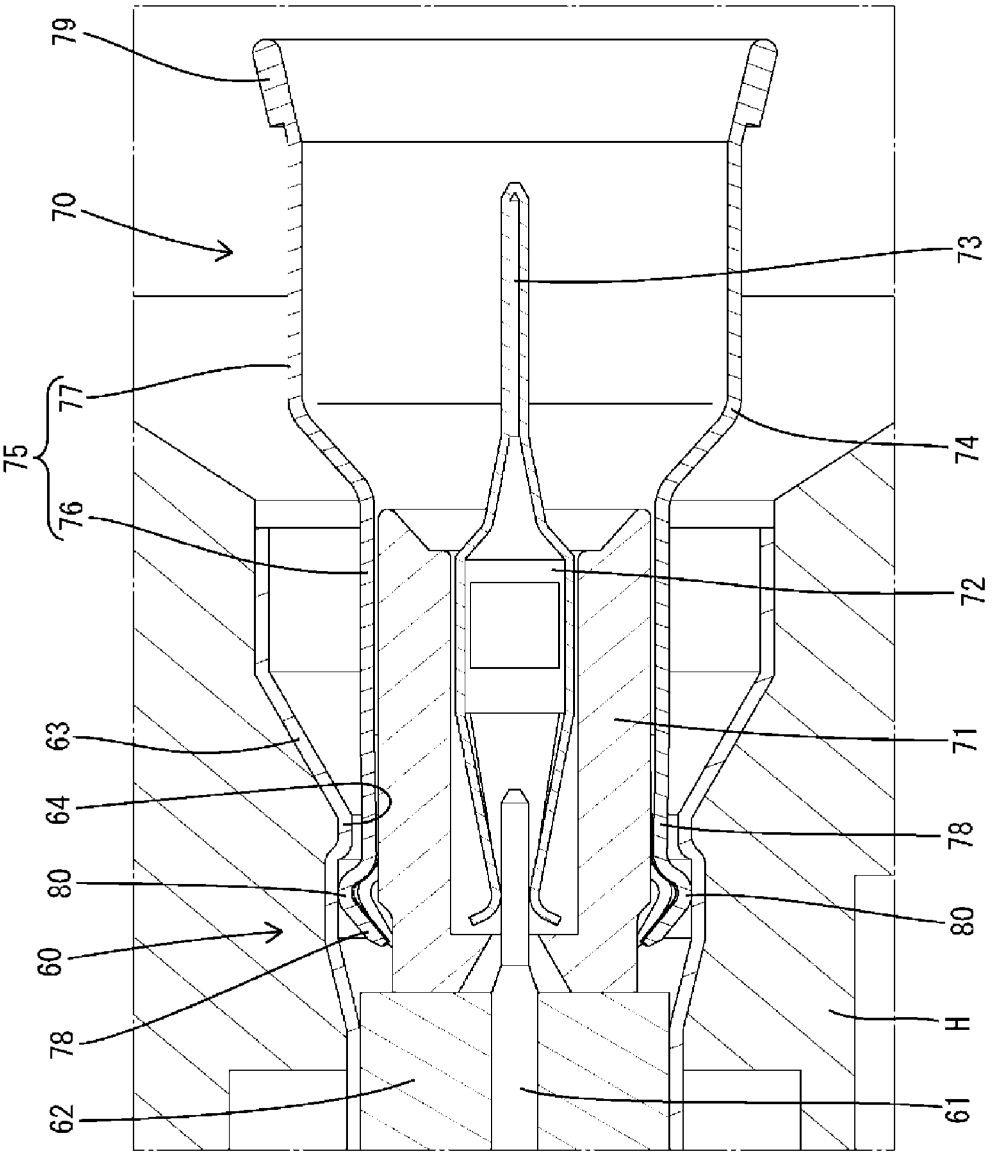
FIG. 7 is a partial enlarged side view in section showing a state where an adapter is mounted in the mating connector.
Figure 8:
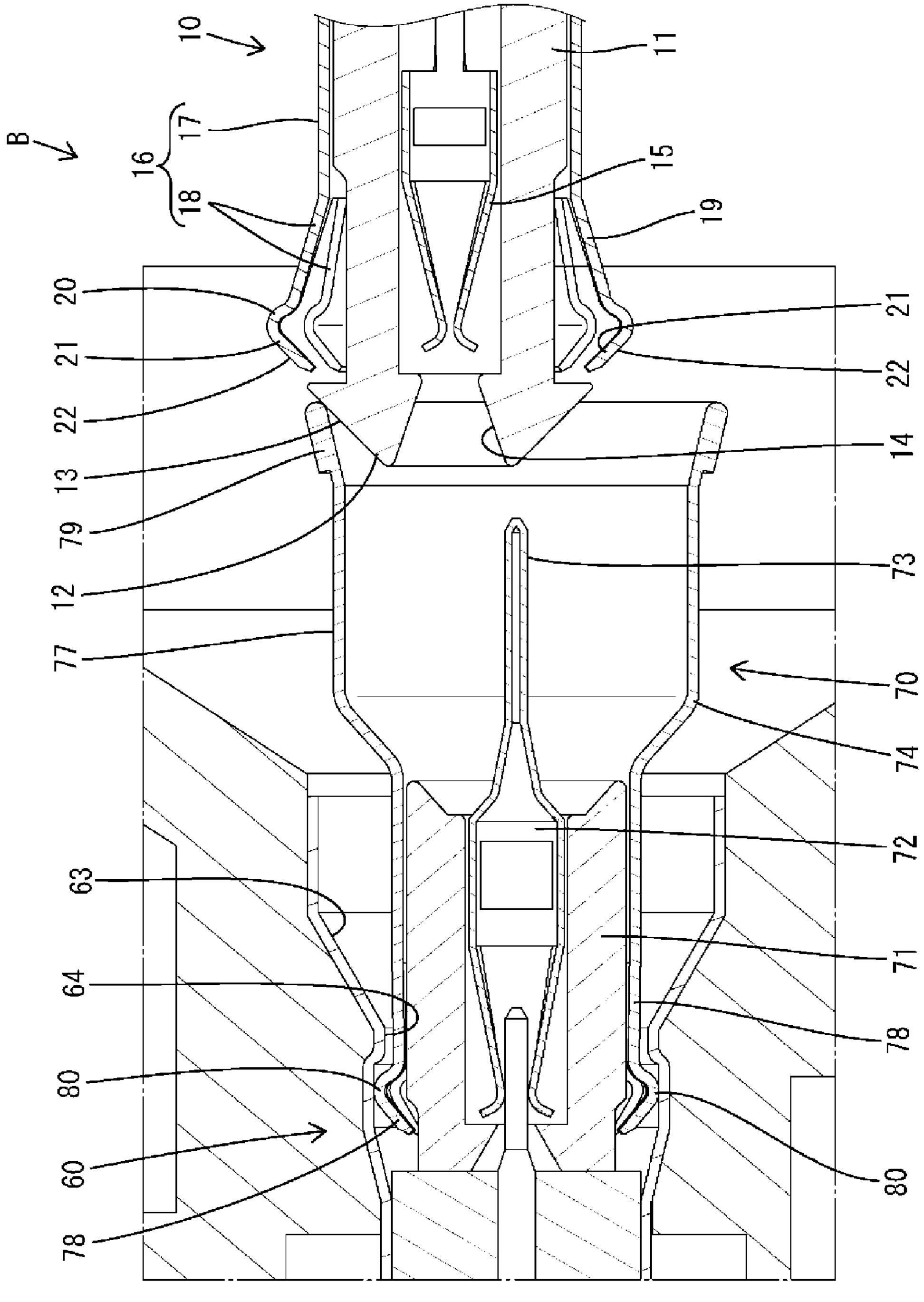
FIG. 8 is a partial enlarged side view in section showing a state where the adapter is guided by a guide portion of a board-side connector.
Figure 9:
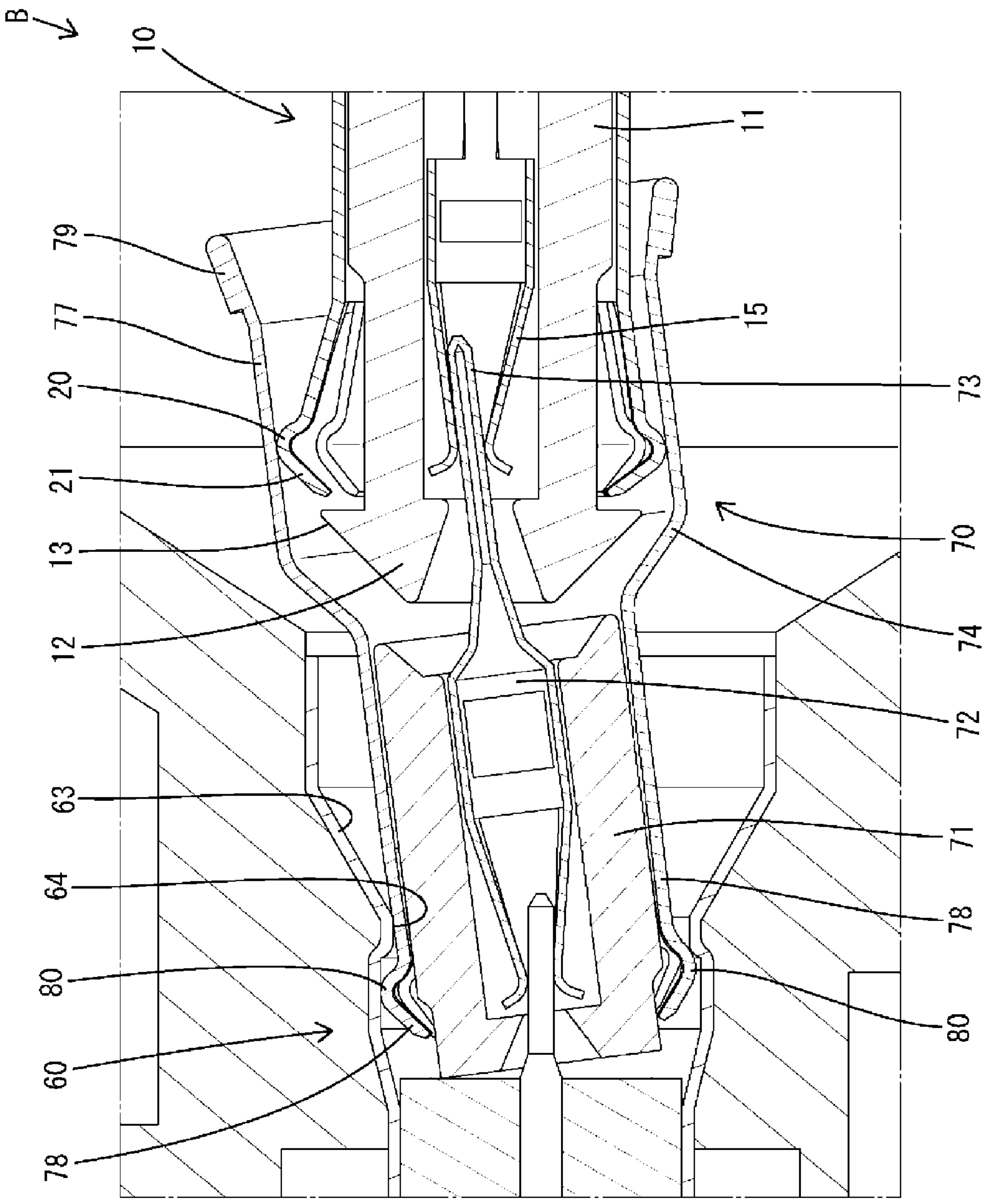
FIG. 9 is a partial enlarged side view in section showing a state where the board-side connector and the mating connector shifted in position are properly connected.

As shown in FIGS. 7 to 9, the adapter 70 includes a tubular movable dielectric 71, an elongated movable inner conductor 72 coaxially mounted in the movable dielectric 71 and a movable outer conductor 74. The movable inner conductor 72 includes a tab 73 projecting forward from the front end of the movable dielectric 71. The movable outer conductor 74 is a single component including a hollow cylindrical outer conductor body portion 75, a plurality of resilient pieces 78 spaced apart in a circumferential direction and a guided portion 79.

The outer conductor body portion 75 includes a small diameter portion 76 and a large diameter portion 77. The large diameter portion 77 has a larger diameter than the small diameter portion 76 and projects forward from the front end of the small diameter portion 76. The plurality of resilient pieces 78 are cantilevered rearward from the rear end of the small diameter portion 76. Out of the outer conductor, the small diameter portion 76 and the resilient pieces 78 surround the movable dielectric 71.

The guided portion 79 has a tapered hollow cylindrical shape to increase a diameter toward the front. The guided portion 79 is formed to continuously extend forward (toward the board-side connector 10) over an entire periphery from the front end edge of the large diameter portion 77. The large diameter portion 77 and the guided portion 79 are located forward of the front end of the movable dielectric 71 and surround the tab 73 of the movable inner conductor 72.

An inner diameter of the guided portion 79 is minimum in the rear end of the guided portion 79 and maximum in the front end of the guided portion 79. A maximum inner diameter of the guided portion 79 is larger than a maximum outer diameter of the board-side connector 10. The maximum outer diameter of the board-side connector 10 is a diameter of a virtual circle connecting enlarged diameter portions 20 of a board-side outer conductor 16. A minimum inner diameter of the guided portion 79 and an inner diameter of the large diameter portion 77 are smaller than the maximum outer diameter of the board-side connector 10.

As shown in FIG. 7, the adapter 70 is mounted in the mating connector 60 with the movable inner conductor 72 connected to the mating inner conductor 61, contact point portions 80 of the resilient pieces 78 resiliently brought into contact with the inner peripheral surface of the mating outer conductor 63 and the contact point portions 80 caused to face the holding protrusion 64 of the mating outer conductor 63 from behind. The adapter 70 in a mounted state is coaxially held in the mating connector 60 with the rear end surface of the movable dielectric 71 held in surface contact with the front end surface of the mating dielectric 62. The movable dielectric 71 is surrounded by the mating outer conductor 63, and the large diameter portion 77 and the guided portion 79 of the adapter 70 project further forward than the front end of the mating outer conductor 63.

Next, a process of connecting the board-side connector 10 and the mating connector 60 with the board-side connector 10 positionally shifted relatively upward with respect to the mating connector 60 is described. If the board-side connector 10 and the mating connector 60 are brought closer while facing each other with the axes held in parallel, an upper end part of the front end of the guided portion 79 comes into contact with an upper end part of a first guide surface 13 of a first guide portion 12 as shown in FIG. 8. At this time, the adapter 70 is held in a horizontal posture coaxial with the mating connector 60.

If the board-side connector 10 and the mating connector 60 are further brought closer from this state, the guided portion 79 slides in contact with the first guide surface 13 and the adapter 70 is displaced to tilt the axis with respect to the mating connector 60 by the inclination of the first guide surface 13. At this time, the rear surface of the movable inner conductor 72 is separated while being tilted with respect to the front surface of the mating inner conductor 61. The contact point portions 80 of the resilient pieces 78 are kept in contact with the mating outer conductor 63.

If the board-side connector 10 and the mating connector 60 are further brought closer, the guided portion 79 rides onto second guide portions 21 from the outer peripheral edge of the first guide surface 13 and slides in contact with the second guide surfaces 22, and the adapter 70 is further inclined by the inclination of the second guide surfaces 22. After the guided portion 79 passes through the second guide portions 21 and the enlarged diameter portions 20, the board-side connector 10 and the mating connector 60 are further connected in a state where the large diameter portion 77 of the adapter 70 slides in contact with the enlarged diameter portions 20. During this time, the board-side inner conductor 15 and the tab 73 of the movable inner conductor 72 are connected and, as shown in FIG. 9, the board-side connector 10 and the mating connector 60 are properly connected.

Other Embodiments

The present invention is not limited to the above described and illustrated embodiments, but is represented by claims. The present invention is intended to include all changes in the scope of claims and in the meaning and scope of equivalents and also include the following embodiments.

Although the guide portions are formed on the board-side dielectric and the board-side outer conductor in the above embodiment, the guide portion may be formed only on the board-side dielectric or only on the board-side outer conductor.

Although the guide portion of the board-side dielectric is formed to cover the tip parts of the resilient contact pieces in the above embodiment, the guide portion of the board-side dielectric may be formed not to cover the tip parts of the resilient contact pieces.

Although the guided portion is integrally formed to the movable outer conductor in the above embodiment, the guided portion may be formed on a dedicated component separate from the movable outer conductor or on the movable dielectric.

Although the board-side outer conductor constituting the board-side connector includes the plurality of resilient contact pieces in the above embodiment, the board-side outer conductor may be in the form of a tube continuous over an entire periphery.

The present invention can be applied not only to connector devices for in-vehicle camera, but also to connector devices for other uses.

LIST OF REFERENCE NUMERALS

A . . . connector device
B . . . connector device
H . . . housing
M . . . mounting surface
P . . . circuit board
10 . . . board-side connector
11 . . . board-side dielectric
12 . . . first guide portion (guide portion of board-side dielectric)
13 . . . first guide surface
14 . . . guiding surface
15 . . . board-side inner conductor
16 . . . board-side outer conductor
17 . . . hollow cylindrical portion
18 . . . resilient contact piece
19 . . . base portion
20 . . . enlarged diameter portion
21 . . . second guide portion (guide portion of board-side outer conductor)
22 . . . second guide surface
30 . . . mating connector
31 . . . mating inner conductor
32 . . . mating dielectric
33 . . . holding portion
34 . . . holding projection
35 . . . mating outer conductor
40 . . . adapter
41 . . . movable dielectric
42 . . . accommodation recess
43 . . . movable inner conductor
44 . . . tab
45 . . . movable outer conductor
46 . . . outer conductor body portion
47 . . . small diameter portion
48 . . . large diameter portion
49 . . . resilient piece
50 . . . guided portion
51 . . . holding recess
60 . . . mating connector
61 . . . mating inner conductor
62 . . . mating dielectric
63 . . . mating outer conductor
64 . . . holding protrusion
70 . . . adapter
71 . . . movable dielectric
72 . . . movable inner conductor
73 . . . tab
74 . . . movable outer conductor

75 . . . outer conductor body portion
76 . . . small diameter portion
77 . . . large diameter portion
78 . . . resilient piece
79 . . . guided portion
80 . . . contact point portion

What is claimed is:

1. A connector device, comprising:

a board-side connector having a circular cross-sectional shape, the board-side connector being fixed to a circuit board with an axis oriented perpendicular to the circuit board;

a mating connector facing the board-side connector;

an adapter rockably supported in the mating connector, a tip part of the adapter being connected to the board-side connector;

a guide portion provided on a tip part of the board-side connector, an outer peripheral surface of the guide portion being inclined to reduce a diameter toward a tip side; and a guided portion provided on the tip part of the adapter, the guided portion correcting a position shift of the adapter with respect to the board-side connector by sliding in contact with the guide portion, wherein a part of the board-side connector having a maximum diameter is the guide portion, the board-side connector includes:

a board-side dielectric; and a board-side outer conductor surrounding the board-side dielectric and including a plurality of resilient contact pieces cantilevered forward toward the adapter on a tip portion of the board-side outer conductor, the guide portion includes:

a first guide portion provided on a tip portion of the board-side dielectric; and a plurality of second guide portions provided on tip portions of the resilient contact pieces, respectively, and the first guide portion covers tip portions of the second guide portions from front.

2. The connector device of claim 1, wherein:

the board-side connector further includes a board-side inner conductor, and the board-side dielectric projects further toward the adapter than the board-side inner conductor.

3. The connector device of claim 1, wherein a clearance in a radial direction is secured between the guided portion and the board-side outer conductor with the adapter and the board-side connector fit.

4. The connector device of claim 1, wherein:

a portion of the board-side dielectric between the first guide portion and the circuit board has a diameter less than a maximum diameter of the first guide portion.

5. The connector device of claim 1, wherein:

the board-side dielectric and the first guide portion are integrally formed, the resilient contact pieces and the second guide portions are integrally formed, a diameter of a virtual circle connecting the tip portions of the second guide portions is smaller than a maximum diameter of the first guide portion, and the first guide portion projects further toward the adapter than the second guide portions to cover the tip portions of the second guide portions from front.

6. The connector device of claim 1, wherein the guided portion is formed on a tip part of a movable outer conductor constituting the adapter.

7. The connector device of claim 6, wherein:

the plurality of resilient contact pieces are spaced apart in a circumferential direction, and the guided portion and the movable outer conductor surround the plurality of resilient contact pieces with the adapter and the board-side connector fit.

* * * * *